United States Patent
Schneider

(10) Patent No.: US 12,162,162 B2
(45) Date of Patent: Dec. 10, 2024

(54) METHOD AND DATA PROCESSING DEVICE FOR ANALYZING A SENSOR ASSEMBLY CONFIGURATION AND AT LEAST SEMI-AUTONOMOUS ROBOTS

(71) Applicant: Robert Bosch GmbH, Stuttgart (DE)

(72) Inventor: Peter Schneider, Holzgerlingen (DE)

(73) Assignee: Robert Bosch GmbH, Stuttgart (DE)

(*) Notice: Subject to any disclaimer, the term of this patent is extended or adjusted under 35 U.S.C. 154(b) by 491 days.

(21) Appl. No.: 16/823,706

(22) Filed: Mar. 19, 2020

(65) Prior Publication Data

US 2020/0298407 A1    Sep. 24, 2020

(30) Foreign Application Priority Data

Mar. 20, 2019  (DE) ...................... 10 2019 203 808.5

(51) Int. Cl.
 *B25J 9/16* (2006.01)
 *G06F 17/16* (2006.01)
 *G07C 3/00* (2006.01)

(52) U.S. Cl.
 CPC .......... *B25J 9/1674* (2013.01); *B25J 9/1697* (2013.01); *G06F 17/16* (2013.01); *G07C 3/00* (2013.01)

(58) Field of Classification Search
 CPC .......... G06F 17/16; G07C 3/00; B25J 9/1674; B25J 9/1697; G06N 20/00; G06V 20/56;
 (Continued)

(56) References Cited

U.S. PATENT DOCUMENTS

| | | | |
|---|---|---|---|
| 8,184,157 B2 * | 5/2012 | Mittal | G06T 7/97 348/169 |
| 2007/0067678 A1 * | 3/2007 | Hosek | G05B 23/0235 714/25 |

(Continued)

FOREIGN PATENT DOCUMENTS

DE    10 2014 014 307 A1    3/2016

OTHER PUBLICATIONS

Hochbaum et al. (Convex Separable Optimization Is Not Much Harder than Linear Optimization, Journal of the Association for Computing Machinery, vol. 37, No. 4, Oct. 1990, pp. 843-862. ( hereinafter Hochbaum ). (Year: 1990).*

(Continued)

*Primary Examiner* — Kyle R Quigley
(74) *Attorney, Agent, or Firm* — Maginot, Moore & Beck LLP

(57) ABSTRACT

A method for analyzing a sensor assembly configuration of an at least semi-autonomous robot includes determining a plurality of spatial segments that spatially subdivide an environment of the robot. The method further includes determining an available individual component performance of a respective individual component of the sensor assembly configuration in relation to the spatial segments. The method further includes determining a sensor assembly requirement that must be satisfied by the sensor assembly configuration in relation to the spatial segments. A linear optimization function with parameters that include the spatial segments, the individual component performances, and the sensor assembly requirements is generated and then solved according to the method. The solution of the linear optimization function indicates if the environment of the robot is configured to be captured by the sensor assembly configuration in (Continued)

accordance with the sensor assembly requirement. A data processing device in one embodiment executes the method.

13 Claims, 4 Drawing Sheets

(58) Field of Classification Search
CPC .... G01S 13/862; G01S 13/865; G01S 13/867; G01S 13/931; G01S 15/93; G01S 17/931; G01S 2013/9323; G01S 2013/9324; G01S 2013/9327

See application file for complete search history.

(56) References Cited

U.S. PATENT DOCUMENTS

| | | | | |
|---|---|---|---|---|
| 2008/0249662 | A1* | 10/2008 | Nakamura | B62D 57/032 901/1 |
| 2012/0084541 | A1* | 4/2012 | Mattikalli | G06Q 10/04 713/1 |
| 2014/0240690 | A1* | 8/2014 | Newman | G01S 7/4972 356/4.01 |
| 2015/0378361 | A1* | 12/2015 | Walker | G06T 7/194 114/343 |
| 2016/0162743 | A1* | 6/2016 | Chundrlik, Jr. | G06V 20/58 348/148 |
| 2017/0285165 | A1* | 10/2017 | Khlifi | G01S 13/931 |
| 2018/0288320 | A1* | 10/2018 | Melick | G01S 13/931 |
| 2019/0050692 | A1* | 2/2019 | Sharma | G06F 18/254 |
| 2019/0113920 | A1* | 4/2019 | England | B60W 30/18159 |
| 2019/0178988 | A1* | 6/2019 | England | G01S 13/42 |
| 2019/0179979 | A1* | 6/2019 | Melick | G01P 21/02 |
| 2019/0377351 | A1* | 12/2019 | Phillips | G05D 1/0214 |
| 2019/0382032 | A1* | 12/2019 | Yeung | G07C 5/0808 |
| 2020/0117199 | A1* | 4/2020 | Akella | B60W 30/143 |

OTHER PUBLICATIONS

Manquinho et al., Satisfiability-Based Algorithms for 0-1 Integer Programming, IST, Jun. 1998 (Year: 1998).*

* cited by examiner

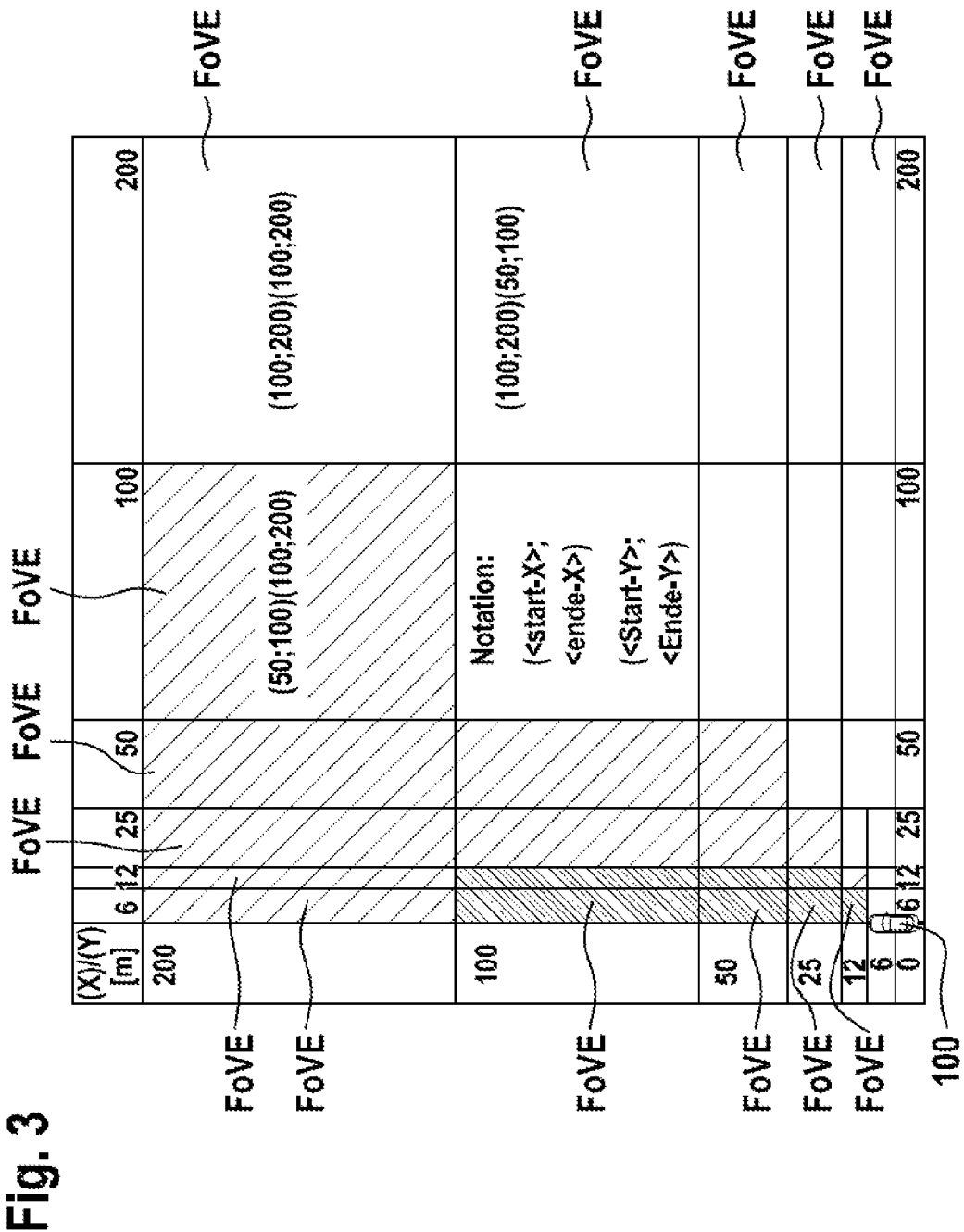

Fig. 4

| | solution | StereoCam | TeleCam | NearCamF | NearCamL | MidRadarFL | LongRadarF | LidarFL | <...> | LiCamFL | | | | |
|---|---|---|---|---|---|---|---|---|---|---|---|---|---|---|
| | | | | | | | | | | | | | | Variables Vector |
| FoVE | Costs | 200 | 200 | 100 | 100 | 100 | 100 | 300 | 100 | 400 | | overall cost | 0 | |
| | | Global Given Properties | | | | | | | | | | Global Needed Properties | | |
| Safety Req. | FoV redundancy | | | | | | | | | | | | | |
| | ASIL | 2 | 2 | 2 | 2 | 2 | 2 | | | | | | ≥ | 2 |
| | Ojekt<Attribute> | 3 | 3 | 3 | 3 | 2 | 4 | | | | | | ≥ | 4 |
| | Objekt classification <Type> | 3 | 3 | 3 | 3 | 1 | 4 | | | | | | ≥ | 4 |
| | | | | | | | | | | | | | ≥ | 2 |
| E/E Architecture | Powernet-1 | 1 | 1 | 1 | 1 | 1 | 1 | | | | | #Powernets | ≥ | 2 |
| | Powernet-2 | | | | | | | | | | | | | |
| | | Local Given Properties | | | | | | | | | | Local Needed Properties | | |
| | | Modelling Matrix | | | | | | | | | | SUM-PRODUCT | Constraint-Constant Operator | |
| | FoV-Attributes | | | | | | | | | | | | | |
| x | y | | | | | | | | | | | | | |
| 0 | 0 | FoVE coverage | 1 | 1 | 1 | 1 | 1 | | | | | 0 | ≥ | 2 |
| | | ASIL | 2 | 2 | 2 | 2 | 2 | 2 | | | | 0 | ≥ | 4 |
| | | Object attribute | 3 | 3 | 3 | 2 | 1 | 3 | | | | 0 | ≥ | 4 |
| | | Object classification <Type> | 3 | 3 | 3 | 1 | 1 | 3 | | | | 0 | ≥ | 2 |
| | | Powernet-1 dependency | | | | | | | | | | 0 | ≥ | 1 |
| | | Powernet-2 dependency | | | | | | | | | | 0 | ≥ | 1 |
| 0 | 1 | FoVE coverage | 2 | 2 | 2 | 1 | 1 | 2 | | | | 0 | ≥ | 2 |
| | | ASIL | 2 | 2 | 2 | 2 | 2 | 2 | | | | 0 | ≥ | 4 |

METHOD AND DATA PROCESSING DEVICE FOR ANALYZING A SENSOR ASSEMBLY CONFIGURATION AND AT LEAST SEMI-AUTONOMOUS ROBOTS

This application claims priority under 35 U.S.C. § 119 to patent application no. DE 10 2019 203 808.5, filed on Mar. 20, 2019 in Germany, the disclosure of which is incorporated herein by reference in its entirety.

BACKGROUND

The present disclosure relates to a method as well as a data processing device for analyzing a sensor assembly configuration of an at least semi-autonomous robot. The disclosure further relates to an at least semi-autonomous robot. The disclosure further relates to a computer program as well as a machine-readable storage medium.

In automation technology, robotics, automotive engineering, etc., there are functions in which, for example, an environment of a robot is perceived or detected, i.e. an environment detection, in order to be able to steer the robot at least semi-autonomously through the environment. For this purpose, a plurality of detection devices, such as sensors, etc., are often required, which are used together as a sensor assembly while the respective detection data is fusioned.

For environment detection, numerous environment perception functions can be prescribed, which can comprise, for example, the establishment of a distance from or to objects, the establishment of the speeds of objects, the establishment of geometric sizes of objects, the establishment of an object type (e.g. traffic sign, traffic light signals, pedestrian, motor vehicle, lane boundary, etc.), etc. It can further be required that the different environment perception functions are performed reliably in different environmental conditions and for a large variety of object types. These environmental conditions can be influenced by, e.g., the weather in the environment such as, e.g., sun, clouds, rain, snow, the light conditions in the environment such as day, night, dusk, etc., the season such as, e.g., spring, summer, fall, winter, etc. The variety of object types can comprise, for example, different sizes, geometries, colours, patterns, materials such as metal, wood, fabric, water, etc. and/or states of movement such as stationary, slow, fast, etc., or the like.

Besides the functional aspects described above, there can also be requirements regarding E/E safety, which also have to be satisfied by the sensor assembly and which may be independent of the respective sensor performance for individual sensors. For an analysis and derivation of requirements for the safeguarding of E/E safety, numerous experiments and tests may be necessary.

For an at least semi-autonomous robot, an overview of the large number and variety of use cases/scenarios to be considered and requirements resulting therefrom for the detection of the environment can only be achievable with difficulty, which complicates an analysis of a selected sensor assembly configuration with respect to the design criteria such as the above-mentioned functional aspects and E/E safety but also costs, etc.

SUMMARY

Embodiments of the disclosure provide an improved alternative for analyzing a sensor assembly configuration of an at least semi-autonomous robot. Further advantageous embodiments of the disclosure result from the dependent claims and the description, as well as the accompanying figures.

A first aspect of the disclosure provides a, in particular model-based, method for analyzing a sensor assembly configuration of an at least semi-autonomous robot. The method is preferably computer-implemented and provides the following steps:

A plurality of spatial segments is determined, which subdivide an environment of the robot spatially. The spatial segments can also be called field-of-view elements (FoVE). In other words, the space around the robot is broken down into different segments. The spatial segments can also satisfy one or more characteristics, for example that a sum of all spatial segments completely covers the space around the robot up to a defined distance (e.g. 200 m), every spatial segment is uniquely identifiable and/or delineates a physical distance sector, for example also in all three spatial directions, in relation to the robot, etc.

At least one available individual component performance of a respective individual component, e.g. of an individual sensor, of a digital (street) map, etc., of the sensor assembly configuration is determined in relation to the determined spatial segments. In other words, it is specified for every spatial segment which individual component performance the respective individual component can perform or satisfy. It is clear that there can also simultaneously be a plurality of individual component performances for a single spatial segment.

At least one sensor assembly requirement is determined which must be satisfied by the sensor assembly configuration formed by the individual components in relation to the determined spatial segments. In other words, it is specified for every spatial segment which requirements must be performed or satisfied by the sensor assembly for each robot use case.

A, in particular model-based, linear optimization function is generated, the parameters of which are constituted by at least the determined spatial segments, the determined individual component performances and/or the determined sensor assembly requirements.

The generated linear optimization function is then solved, wherein the solution of the linear optimization function at least indicates whether the environment of the robot can be captured by the sensor assembly configuration in accordance with the sensor assembly requirement.

By means of the proposed method, not only can the spatial dependencies of different use-case requirements be not only specified in text in this new approach, as in a conventional engineering-requirements process, and derived over different requirement levels down to the individual component, e.g. the individual sensor, but spatial segments around the vehicle are additionally defined in a formal model, for which spatial segments the environment perception function to be performed by the sensor assembly, i.e. preferably not by the respective individual sensor, is specified in a formal notation, which may include a quality standard and E/E safety characteristics. In addition, the environment perception capabilities, architecture dependencies and E/E safety characteristics are specified in the same formal notation for each individual sensor, for example already in the development phase, and integrated together with the formalized use-case requirements into the model on which the optimization function is based. The thus created model can now be tested for different characteristics in an automated manner in order to be able to identify efficiently potential gaps in the sensor assembly configuration, which can result, e.g., from modifications in the sensor assembly or newly added use cases.

As a result of the special form of the notation or modelling of requirements and characteristics in the form of an optimization problem, it is not only possible to test whether the sensor assembly currently being analyzed generally satisfies the requirements, but potential for optimization can be identified, where applicable, directly. This renders possible a high degree of automation in analysis, a possibility of carrying out global configuration optimizations over all use cases by means of the consideration and/or modelling of different aspects, e.g. functional, E/E safety, common cause failures, etc., and a reduced amount of specification work through a particularly lean and yet precise formal notation.

In one embodiment, the solution of the linear optimization function can further indicate whether the respective individual component is required for satisfying the sensor assembly requirement. In other words, one or more individual components, e.g. individual sensors, which are not necessarily required for satisfying the requirements can be removed during and/or after the solving of the optimization problem. This renders possible reduced supply costs for the sensor assembly configuration, as functionally superfluous individual components can be identified and removed.

According to one embodiment, the solution of the linear optimization function can further indicate which individual component or which of the individual components of the sensor assembly configuration are at a minimum necessary for satisfying the determined sensor assembly requirement. This renders possible reduced supply costs for the sensor assembly configuration, as functionally superfluous individual components can be identified and removed.

In one embodiment, one or more characteristics of the individual component can be specified in order to determine the individual component performance, in particular by means of a model-based, formal notation, said characteristics being selected from:
  at least one environment perception capability of the individual component,
  at least one functional weakness of the individual component,
  a satisfiability of safety requirements by the individual component and
  at least one dependency on other components within the sensor assembly configuration and/or on other components of an architecture of the robot.

In other words, it can be specified for every spatial segment for each individual component which environment perception functions the individual component can perform, which functional weaknesses the individual component has, such as, for example, "reduced performance in dark conditions", which E/E safety requirements the individual component satisfies and/or which technical and/or functional dependencies the individual component has in relation to other architecture elements. Detailed information regarding the individual component performance can thus be fed into the model on which the optimization function is based, wherein this can occur by means of a formal notation.

According to one embodiment, one or more characteristics of the individual component can be specified for determining the sensor assembly requirement, said characteristics being selected from:
  at least one environment perception function to be performed,
  at least one functional weakness to be avoided,
  at least one safety requirement to be satisfied
  at least one dependency on other components within the sensor assembly configuration and/or on other components of an architecture of the robot to be avoided, and
  at least one cost factor associated with the respective individual component.

In other words, it can be specified for each spatial segment, in particular for each robot use case, of the sensor assembly which environment perception functions are to be performed, which functional weaknesses are to be avoided, which E/E safety requirements are to be satisfied and/or technical and functional dependencies to be avoided exist. Detailed information regarding the individual component performance can thus be fed into the model on which the optimization function is based, wherein this can occur by means of a formal notation.

In one embodiment, the individual component performance and/or the sensor assembly requirement can be specified by a number of whole numbers, i.e. integers. This represents a particularly simple notation with which the schema can be defined. For example, certain number ranges can be used here certain parts of the model, i.e., for example, numerical values from 0 to 3 for individual component requirements or functions and numerical values from 3 to 6 for sensor assembly requirements or functions. Binary numerical values can also be used, for example for functional weaknesses, etc. Certain numerical values can also be used for E/E safety requirements, etc. This enables a precise and yet readily manageable modelling of the different model variables on which the generated optimization function is based. According to one embodiment, the linear optimization function can be generated as an integer linear program, ILP. This enables a precise and yet readily manageable modelling when generating the linear optimization function. The ILP can be solved algorithmically, for example by means of heuristic methods, cutting plane methods, etc., wherein the modelling or the notation on which the latter is based gives rise to relatively little calculation work.

In one embodiment, the generated linear optimization function can yield:
Minimize $c^T x$,
with the following conditions:

$Ax \geq b,$ $0 \leq x \leq 1,$ and $x \in Z,$ wherein x is a variable vector for a component of the sensor assembly configuration, c is a parameter vector with e.g. costs of the individual component, A is a matrix with a modelling of the individual component performances and b is a vector with a modelling of the sensor assembly requirements.

According to one embodiment, the plurality of spatial segments around the robot can be determined so that their sum completely covers a space around the robot up to a predetermined distance. The analyzed sensor assembly configuration can thus effect an environment perception that is as complete and precise as possible.

In one embodiment, the available individual component performance and/or the sensor assembly requirement being satisfied can be determined for every single one of the plurality of spatial segments. The analyzed sensor assembly configuration can thus effect an environment perception that is as complete and precise as possible.

According to one embodiment, the sensor assembly configuration can be adjusted and/or checked using the solution of the linear optimization function. This may optionally occur manually by removing individual sensors that have been identified as dispensable from a corresponding specification. This can, however, preferably also occur in that a data processing device includes or removes the individual sensors that have been identified in accordance with the solution either as required or obsolete in or from a specification in an at least semi-automated manner. The specification can be a specification sheet or the like, where appropriate managed electronically.

A second aspect of the disclosure provides a data processing device which is adapted to execute the method according to the first aspect in one or more of the variants described above.

A third aspect of the disclosure provides an at least semi-autonomous robot having a sensor assembly configuration, which is analyzed or configured by means of the method according to the first aspect in one or more of the variants described above, wherein the robot can be controlled using detection data provided by the sensor assembly configuration. The robot can be provided in a particularly economical manner, as the sensor assembly configuration preferably only comprises those individual components required for a reliable environment perception, while to this end superfluous individual components can be identified and omitted.

A fourth aspect of the disclosure provides a computer program which, when it is executed, for example, by a processor of a data processing device, is adapted to execute a method according to the first aspect.

The computer program can be loaded and/or saved, for example, in a working memory of a data processing device such as a data processor, wherein the data processing device can also be part of an embodiment of the present disclosure. This data processing device can be adapted to execute procedural steps of the method described above. The data processing device can further be adapted to execute the computer program or the method automatically and/or to execute inputs of a user. The computer program can also be provided over a data network, such as the Internet, and downloaded from such a data network to the working memory of the data processing device. The computer program can also comprise an update of an already existing computer program, whereby the existing computer program can be rendered capable of, for example, carrying out the method described above.

A fifth aspect of the disclosure provides a computer-readable storage medium. The computer-readable storage medium can comprise in particular a computer program according to the fourth aspect.

The computer-readable storage medium can in particular, but not necessarily, be a non-volatile medium, which is suitable in particular for storing and/or distributing a computer program. The computer-readable storage medium can be a CD-ROM, a DVD-ROM, an optical storage medium, a solid medium or the like, which is delivered with or as a part of other hardware. Additionally or alternatively, the computer-readable storage medium can also be distributed or sold in another form, for example via a data network such as the Internet or other wired or wireless telecommunications systems. To this end, the computer-readable storage medium can be implemented, for example, as one or more data packets.

Further measures that enhance the disclosure are illustrated in greater detail in the following together with the description of the preferred embodiments of the disclosure with the aid of figures.

BRIEF DESCRIPTION OF THE DRAWINGS

In the following, illustrative examples of the disclosure are described in detail with reference to the accompanying figures. The figures show.

The figures are merely schematic and not true to scale. Identical elements, elements with an identical function or similar elements are provided with the same references throughout the figures.

DETAILED DESCRIPTION

Figure 1:
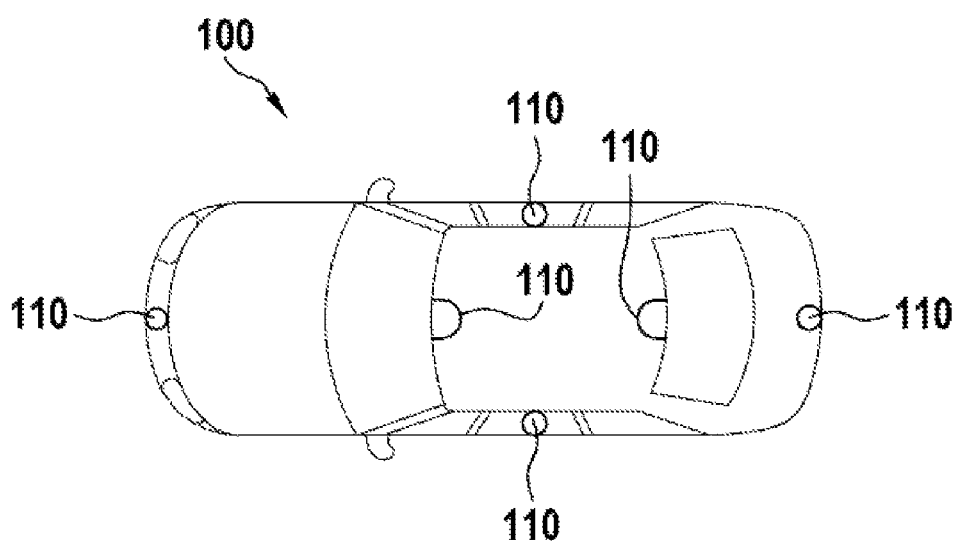
FIG. 1 a robot, which is configured here illustratively as a vehicle, with a sensor assembly configuration, which comprises a plurality of sensors as individual components, FIG. 2 a schematic top view of an approach for analyzing a sensor assembly configuration of an at least semi-autonomous robot, whose environment is subdivided into a plurality of spatial segments, wherein overlapping areas of different individual components or individual sensors of a sensor assembly configuration are indicated, FIG. 3 a mapping of sensor assembly requirements to specific spatial segments which subdivide an environment of a robot, and FIG. 4 a section of a modelling template in which integer values indicate a sensor assembly requirement and an individual component performance in relation to respective spatial segments subdividing an environment of a robot.

FIG. 1 shows an at least semi-autonomous robot 100, which is merely illustratively configured here as a vehicle and which is designated as such in the following. The vehicle 100 here is, as an example, a motor vehicle driven in an at least semi-automated manner, but in particular in a highly or completely automated motor vehicle. Accordingly, the vehicle 100 has actuators and an automotive drive unit, which can be electronically controlled for the automated control of the vehicle 100, for example for accelerating, braking, steering, etc. Alternatively, the at least semi-autonomous robot can also be a different mobile robot (not depicted), for example one that moves by flying, swimming, diving, or stepping. The mobile robot can also be, for example, an at least semi-autonomous lawnmower or an at least semi-autonomous cleaning robot. Also in these cases, one or more actuators, e.g. a drive unit and/or a steering system of the mobile robot, can be controlled electronically so that the robot moves at least semi-autonomously.

The vehicle 100 further has a sensor assembly or a sensor assembly configuration, which comprises a plurality of individual sensors 110 as respective individual components, such as optical sensors, in particular cameras, ultrasound or radar sensors, LIDAR sensors, etc., which are adapted for the monitoring/detection of a vehicle environment of the vehicle 100. Detection data of the sensors 110 are provided, for example, to a data processing device (not shown) of the vehicle 100, which is adapted to plan a driving strategy based on the detection data and to control the vehicle actuators and/or the drive unit accordingly. Additionally, according to some embodiments, the sensor assembly configuration also comprises digital maps, navigation data of a satellite navigation system, weather data provided via communications interfaces, etc., which can be collated as part of the sensor assembly configuration.

The sensor assembly must satisfy a variety of requirements in the vehicle 100 and is subject to different basic conditions and dependencies, e.g. requirements regarding E/E safety based on safety standards (e.g. ISO 26262), etc. Example requirements can read, for example, in text form:

"Avoid errors that lead to . . . ", "Detect error in . . . ", etc. It must be determined on this basis whether the sum of the requirements and basic conditions is met in the sensor assembly by the plurality of individual sensors 110 of the sensor assembly, which can have, for example, a double-digit number, i.e. 10, 11, 12, . . . , 15, . . . , 20 or more, of individual sensors 110, which can also be subdivided into 2, 3 or more different sensor types with different characteristics and coverage areas. For this purpose, time-consuming analyses regarding different domains such as functional issues, E/E architecture, safety issues, are traditionally necessary. Even if it can be shown in such a cross-domain analysis that all requirements and basic conditions are satisfied by the selected sensor assembly configuration, the analysis result can potentially lose its validity with the next modification of the requirements, sensor assembly or E/E architecture of the vehicle 100.

In order to render governable the problem of the high complexity and many dependencies in the framework of the development of the vehicle 100 or its sensor configuration, an approach is described in the following that makes it possible to represent on an abstracted system level the different aspects in a common model.

Figure 2:
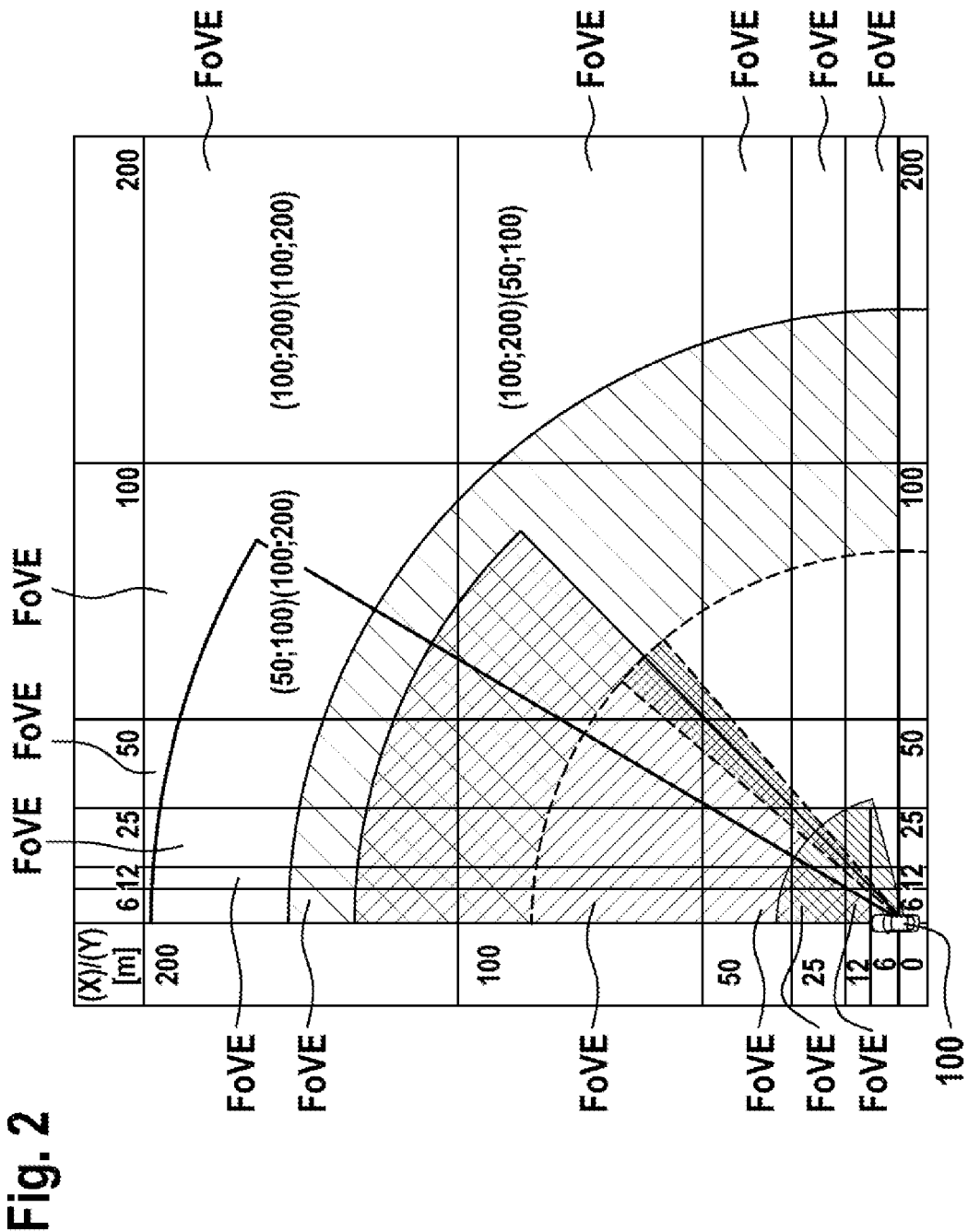

FIG. 2 shows a schematic, two-dimensional top view of a model-based approach for analyzing the sensor assembly configuration of the vehicle 100. The environment of the vehicle 100 is subdivided into a plurality of spatial segments FoVE, which can also be called field-of-view elements. In this example, the vehicle 100 is arranged in the lower, left-hand corner of FIG. 2 and constitutes there the origin of a Cartesian coordinate system x-y-z with at least one x-axis, which indicates a distance in m (metres) relative to the vehicle 100, and at least one y-axis, which indicates a distance in m (metres) relative to the vehicle 100.

According to the model-based approach, the space around the vehicle 100 is broken down into the different segments, namely the spatial segments FoVE, which satisfy the following characteristics:
 a. The sum of all spatial segments FoVE completely covers the space around the vehicle 100 up to a defined distance (e.g. 200 m as in FIG. 2) and
 b. every spatial segment FoVE is uniquely identifiable and specifies a physical distance sector (in all three spatial directions x, y, z) relative to the vehicle 100.

According to the model-based approach, it is further specified for every spatial segment FoVE for each individual sensor 110 of the sensor assembly configuration which
 i. environment perception capability the individual sensor 110 has,
 ii. functional weaknesses the individual sensor 110 may have (e.g. "reduced performance in dark conditions"),
 iii. E/E safety requirements the individual sensor 110 satisfies and
 iv. technical and functional dependencies the individual sensor 110 has in relation to other architecture elements of the sensor assembly configuration and/or of the vehicle 100.

This specification for every spatial segment FoVE for each individual sensor 110 of the sensor assembly configuration indicates an available individual component performance of the respective individual component 110 of the sensor assembly configuration in relation to the determined spatial segments FoVE.

According to the model-based approach,
 i. the environment perception functions to be performed,
 ii. the functional weaknesses to be avoided,
 iii. the E/E safety requirements to be satisfied and
 iv. the technical and/or functional dependencies to be avoided by the sensor assembly are further specified for every spatial segment FoVE for each vehicle use case.

This specification for every spatial segment FoVE indicates a sensor assembly requirement which must be satisfied by the sensor assembly configuration formed from the individual components 110 in relation to the determined spatial segments FoVE.

On this basis, discrete numerical values are used in the model-based approach in order to specify the respectively available individual component performance and/or the respective sensor assembly requirement. An illustrative notation by numerical values relating to the sensor assembly requirement here can be:
 i. environment perception functions are specified in so-called quality classes with the numerical values 0 to 3 (for individual sensor performances) and 3 to 6 (for the sensor assembly).
 ii. Known functional weaknesses are modelled with binary 0 or 1 numerical values. For example, one models as follows: In the absence of a certain weakness—e.g. "Sensor is robust in dark conditions"—this is specified with a 1, whereas if a weakness is present—e.g. "Sensor is not robust in dark conditions"—this is specified with a 0.
 iii. E/E safety requirements (specified in automotive engineering, for example, by Automotive Safety Integrity Levels, ASILs, in accordance with ISO 26262) are specified with the following numerical values in the model, e.g., with QM=0; ASIL-A=1, ASIL-B=2; ASIL-C=3; ASIL-D=4.
 iv. Technical and functional dependencies relating to other architecture elements are modelled with binary 0 or 1 numerical values. For example, one models as follows: If there is no dependency—e.g. "Sensor is independent of windshield wiper."—this is specified with the numerical value 1, whereas in the event of a dependency—e.g. "Sensor is dependent on windshield wiper."—this is specified with a numerical value 0.

In the model, the numerical values of the respective individual sensors 110 are added up linearly.

This is appropriate and admissible, as quality-class values represent (relative) powers of 10 in the residual error rate in detection quality. For example, QC=1 stands for a residual error rate of $10^{-1}$, QC=2 stands for a residual error rate of $10^{-2}$ and QC=3 stands for a residual error rate of $10^{-3}$. The technically required multiplication of error rates in linear representation thus becomes an (exponential) addition in logarithmic representation. The allowed residual error rate per QC can simply be scaled here in any desired manner via the selection of a suitable exponent base (i.e. 50 or 100 could be used instead of 10). Moreover, it can be critical for the sensor assembly of the vehicle 100 whether or not a functional weakness of an individual sensor 110 becomes perceptible at the level of the sensor assembly (if applicable including possible fusion algorithms). As a result, requirements can be applied here which require, for example, that at least X of N sensors are robust vis-á-vis a certain weakness. Moreover, the linear representation in this example corresponds exactly to the decomposition concept from the ISO 26262 safety standard. Moreover, it can be important for the proper operation of the sensor assembly of the vehicle 1100 that, even in the event of a hardware failure, the consequences of the failure do not lead to a shortage of environment data necessary for the safe control of the vehicle 100. As a result, requirements can be applied here which require, for example, that at least X of N sensors are robust vis-á-vis certain hardware failures and their consequences.

An example is described in the following which shows illustratively how the individual component performance or individual sensor performance and the sensor assembly requirement or use-case requirements can be modelled and integrated into the model as integers.

In this example, the individual component performance or individual sensor performance is modelled, wherein, as an example, a video-camera sensor (depending on the resolution) does not yet definitely detect a "No Vehicles" sign as such from a large distance (e.g. 400 m), as only very few pixels capture the sign. Accordingly, it is registered in the model that 0 holds true for "Detection of a 'No Vehicles' sign" for the spatial segments FoVE which correspond to a distance of 200-400 m from the vehicle 100. At an intermediate distance (e.g. 200 m), the sign is already more readily detectable and the detection rate increases, although it is still not always stable. Accordingly, it is registered in the model that 1 holds true for "Detection of a 'No Vehicles' sign" for the spatial segments FoVE which correspond to a distance of 200-400 m from the vehicle 100. At a closer distance (e.g. 100 m), a sufficient number of structures can already be detected in order to be able to clearly detect and correctly interpret the 'No Vehicles' sign. Accordingly, it is registered in the model that 2 holds true for "Detection of a 'No Vehicles' sign" for the spatial segments FoVE which correspond to a distance of 000-100 m from the vehicle 100.

The environment perception function is thus constantly the same; however, it varies over distance with the quality/detection rate. This relation is represented accordingly in the model via the different quality-class values 0/1/2/ . . . for the different distance ranges.

In this example, the sensor assembly requirement or use-case requirements are also modelled, wherein, illustratively for the requirement "Detect a 'No Vehicles' sign in the direction of travel up to a longitudinal distance of at least 200 m relative to the ego vehicle." (i.e. the vehicle 100 here), it is registered in the model that 2 holds true for "Detection of a 'No Vehicles' sign" for the spatial segments FoVE which correspond to a distance of 200-400 m from the vehicle 100. This range is indicated in FIG. 3 by a corresponding hatching. For the requirement "Detect a 'No Vehicles' sign in the direction of travel up to a longitudinal distance of at least 100 m relative to the ego vehicle." (i.e. the vehicle 100 here), it is registered in the model that 4 holds true for the spatial segments FoVE which correspond to a distance of 000-100 m from the vehicle 100. This range is indicated in FIG. 3 by a corresponding hatching.

FIG. 3 shows in a schematic representation a mapping of these sensor assembly requirements or use-case requirements to the spatial segments FoVE. It is apparent that the requirements vary over distance in the x and y directions (in the example according to FIG. 3, only the y direction is considered for the purposes of simplification). The required quality exceeds here the sensor performance of the individual sensor 110; it is thus necessary to improve the quality of the environment detection function "Detection of a 'No Vehicles' sign" in these areas via additional sensors/map data/etc. To this end, for example, additional sensors/map data/etc. are modelled and integrated into the model in an analogous manner to the video sensor illustrated in the example. It can now be ascertained via an addition of the quality numbers whether or not the required quality can be achieved.

FIG. 4 shows an example section of a modelling template in which the integer values are indicated for the sensor assembly requirement and the individual component performance in relation to the respective spatial segments FoVE. In the column "SUM-PRODUCT" (see right side of FIG. 4), the functional possibilities (e.g. for "Detect a 'Do not pass' sign") are offset against the actual coverage of a spatial segment area by a sensor. For example, the (stereo) camera designated as StereoCam can have the functional possibility of detecting a sign "Do not pass signs" at distances up to 200 m with QC-1. As a result of an unfavourable mounting position, viewing direction, etc., the camera designated as StereoCam does not, however, completely cover the area with its sight cone, which is modelled in this example in the line "FoVE coverage", so that the input of the camera designated as StereoCam is not reliable and the area could either be subdivided with a finer granularity (e.g. in 100-175 m+175-200 m) or it is simply assumed in the model that the camera designated as StereoCam does not provide a reliable input in the spatial segment FoVE 100-200 m. In the spatial segment range of 100-200 m, the required functional quality of at least QC-2 is achieved for the detection of the "Do not pass" sign through additional inputs of further sensors, which is formulated in the model in the column "constraint operator" (see right side of FIG. 4) in the form of a "greater than or equal" condition.

The selected modelling format now represents a linear optimization function as an integer linear program, ILP, which can be solved with proven solution methods efficiently and overall optimally. A general form of the model and meanings of the ILP elements for the modelling of the sensor assembly here are:

Minimize $c^T x$, with the following conditions:

$$Ax \geq b,$$

$$0x \leq 1, \text{ and}$$

$$x \in Z,$$

wherein x is a variable vector for a component of the sensor assembly configuration, c is a parameter vector for costs of the respective individual component, A is a matrix with a modelling of the individual component performances and b is a vector with a modelling of the sensor assembly requirements.

In the solution step, the model is thus tested with regard to which of the modelled individual components 110 are necessary in order to satisfy all of the formulated requirements. In the event that there is no solution, this is detected and returned as "Problem insoluble" including the transgressed conditions. It can be derived from this that system weaknesses are still present, which may have to be analyzed further and which may make modifications in the sensor assembly necessary. If there is a solution, it is indicated accordingly in the line "Solution" with 1 or 0 which of the available individual components 110 are at a minimum necessary for a solution. Moreover, first indicators are thus obtained regarding at what point the sensor assembly may still be overdesigned and, if appropriate, at what point it could potentially be reduced. The optimization-friendly structure of the model can further be exploited in order to offer at the start of the development of the vehicle 100 an intentionally overdesigned system consisting of too many sensor-assembly individual components 110 including varying and, where appropriate, even overlapping mounting positions as a solution space. The solution algorithm then automatically generates solution proposals corresponding to the modelled requirements. Based on the solution proposals, the sensor assembly configuration can then be adjusted manually or, preferably, in an automated manner, which can be reflected, for example, in a vehicle-specific specification of the individual components 110 to be used.

Via the allocation of real or virtual component costs, non-technical aspects can also be considered when formulating a solution. For example, a combined value of component costs (e.g. in Euro) and virtual "integration" costs (e.g. low for individual sensors 110 that are relatively easy to integrate into the vehicle 100, e.g. which do not require much constructional space or generate much waste heat, and high for individual sensors 110 that are relatively difficult to integrate) can be used in order to be able to generate optimal solutions even from an OEM/customer perspective, which, however, always meet the technical requirements in all cases.

What is claimed is:

1. A method for analyzing a sensor assembly configuration of an at least semi-autonomous robot, comprising:
   determining a plurality of spatial segments that subdivide an environment of the robot spatially, the plurality of spatial segments varying from one another in both distance and direction from the robot;
   determining individual component performances of respective individual components of a plurality of individual components of the sensor assembly configuration, the individual component performances for each respective individual component including a respective value for every respective spatial segment in the plurality of spatial segments that indicates how well the respective individual component performs in relation to the respective spatial segment;
   determining at least one sensor assembly requirement that must be satisfied by the sensor assembly configuration, the at least one sensor assembly requirement including values indicating how well the sensor assembly must perform in relation to respective spatial segments in the plurality of spatial segments;
   generating a linear optimization function, the parameters of which include at least the plurality of spatial segments, the individual component performances, and the at least one sensor assembly requirement;
   determining which individual components of the plurality of individual components are at a minimum necessary for satisfying the at least one sensor assembly requirement by solving the linear optimization function, wherein the solution of the linear optimization function indicates at least whether the environment of the robot is configured to be captured by the sensor assembly configuration in accordance with the at least one sensor assembly requirement; and
   adjusting, in an automated manner, a configuration of the sensor assembly in a specification of the sensor assembly based on the solution of the linear optimization function.

2. The method according to claim 1, wherein determining the individual component performances includes specifying one or more characteristics of the individual component, the one or more characteristics selected from:
   at least one environment perception capability of the individual component,
   at least one functional weakness of the individual component,
   a satisfiability of safety requirements by the individual component, and
   at least one dependency on one or more of (i) other components within the sensor assembly configuration and (ii) other components of an architecture of the robot.

3. The method according to claim 1, wherein determining the at least one sensor assembly requirement includes specifying one or more characteristics of the individual component, the one or more characteristics selected from:
   at least one environment perception function to be performed,
   at least one functional weakness to be avoided,
   at least one safety requirement to be satisfied,
   at least one dependency on one or more of (i) other components within the sensor assembly configuration to be avoided and (ii) other components of an architecture of the robot to be avoided, and
   at least one cost factor associated with the respective individual component.

4. The method according to claim 1, wherein one or more of the individual component performances and the at least one sensor assembly requirement is specified by a number of integers.

5. The method according to claim 1, wherein the linear optimization function is generated as an integer linear program.

6. The method according to claim 1, wherein the generated linear optimization function yields:

Minimize $c^T x$, with the following conditions:

$Ax \geq b$, $0 \leq x \leq 1$, and $x \in Z$, wherein x is a variable vector for a component of the sensor assembly configuration, c is a parameter vector for costs of the respective individual component, A is a matrix with a modelling of the individual component performances, and b is a vector with a modelling of the at least one sensor assembly requirements.

7. The method according to claim 1, wherein the plurality of spatial segments around the robot are determined so that their sum completely covers a space around the robot up to a predetermined distance relative to the robot.

8. The method according to claim 1, wherein one or more of (i) the individual component performances are determined for every single one of the plurality of spatial segments and (ii) the at least one sensor assembly requirement being satisfied is determined for every single one of the plurality of spatial segments.

9. The method according to claim 1, wherein the sensor assembly configuration is checked using the solution of the linear solution function.

10. The method according to claim 1, wherein a computer program that includes commands causes a computer to execute the method when the computer program is executed by the computer.

11. The method according to claim 10, wherein the computer program is stored on a machine-readable storage medium.

12. A data processing device configured to execute a method for analyzing a sensor assembly configuration of an at least semi-autonomous robot, the method including:
    determining a plurality of spatial segments that subdivide an environment of the robot spatially, the plurality of spatial segments varying from one another in both distance and direction from the robot;

determining individual component performances of respective individual components of a plurality of individual components of the sensor assembly configuration, the individual component performances for each respective individual component including a respective value for every respective spatial segment in the plurality of spatial segments that indicates how well the respective individual component performs in relation to the respective spatial segment;

determining at least one sensor assembly requirement that must be satisfied by the sensor assembly configuration, the at least one sensor assembly requirement including values indicating how well the sensor assembly must perform in relation to respective spatial segments in the plurality of spatial segments;

generating a linear optimization function, the parameters of which include at least the plurality of spatial segments, the individual component performances, and the at least one sensor assembly requirement;

determining which individual components of the plurality of individual components are at a minimum necessary for satisfying the at least one sensor assembly requirement by solving the linear optimization function, wherein the solution of the linear optimization function indicates at least whether the environment of the robot is configured to be captured by the sensor assembly configuration in accordance with the at least one sensor assembly requirement; and adjusting, in an automated manner, a configuration of the sensor assembly in a specification of the sensor assembly based on the solution of the linear optimization function.

13. An at least semi-autonomous robot, comprising:

a sensor assembly configuration that is configured to be one or more of analyzed and configured by a method, the method including:

determining a plurality of spatial segments that subdivide an environment of the robot spatially, the plurality of spatial segments varying from one another in both distance and direction from the robot;

determining individual component performances of respective individual components of a plurality of individual components of the sensor assembly configuration, the individual component performances for each respective individual component including a respective value for every respective spatial segment in the plurality of spatial segments that indicates how well the respective individual component performs in relation to the respective spatial segment;

determining at least one sensor assembly requirement that must be satisfied by the sensor assembly configuration, the at least one sensor assembly requirement including values indicating how well the sensor assembly must perform in relation to respective spatial segments in the plurality of spatial segments;

generating a linear optimization function, the parameters of which include at least the plurality of spatial segments, the individual component performances, and the at least one sensor assembly requirement;

determining which individual components of the plurality of individual components are at a minimum necessary for satisfying the at least one sensor assembly requirement by solving the linear optimization function, wherein the solution of the linear optimization function indicates at least whether the environment of the robot is configured to be captured by the sensor assembly configuration in accordance with the at least one sensor assembly requirement; and adjusting, in an automated manner, a configuration of the sensor assembly in a specification of the sensor assembly based on the solution of the linear optimization function, wherein the robot is configured to be controlled using detection data provided by the sensor assembly configuration.

* * * * *